[12] United States Patent
Lee et al.

(10) Patent No.: US 10,788,725 B2
(45) Date of Patent: Sep. 29, 2020

(54) PHASE MODULATION ACTIVE DEVICE, METHOD OF DRIVING THE SAME, AND OPTICAL APPARATUS INCLUDING THE PHASE MODULATION ACTIVE DEVICE

(71) Applicant: SAMSUNG ELECTRONICS CO., LTD., Suwon-si (KR)

(72) Inventors: Duhyun Lee, Yongin-si (KR); Changgyun Shin, Anyang-si (KR); Jisoo Kyoung, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 15/700,391

(22) Filed: Sep. 11, 2017

(65) Prior Publication Data

US 2018/0074382 A1 Mar. 15, 2018

(30) Foreign Application Priority Data

Sep. 9, 2016 (KR) .......................... 10-2016-0116580

(51) Int. Cl.
*G02F 1/01* (2006.01)
*G02F 1/19* (2019.01)
*G02F 1/29* (2006.01)
*G02B 26/06* (2006.01)
(Continued)

(52) U.S. Cl.
CPC .............. *G02F 1/19* (2013.01); *G02B 26/06* (2013.01); *G02F 1/0018* (2013.01); *G02F 1/0316* (2013.01); *G02F 1/292* (2013.01); *G02F 2203/10* (2013.01); *G02F 2203/50* (2013.01)

(58) Field of Classification Search
CPC ........ G02F 1/19; G02F 1/0316; G02F 1/0018; G02F 1/292; G02F 2203/10; G02F 2203/50; G02F 1/01; G02F 1/165; G02F 1/166; G02F 1/169; G02F 1/1673; G02F 1/3544; G02F 1/1675; G02F 1/16753; G02F 1/16755; G02F 1/16756; G02F 1/16757;
(Continued)

(56) References Cited

U.S. PATENT DOCUMENTS 6,091,463 A 7/2000 Robinson et al.
2004/0218275 A1 11/2004 Ketterson et al.
(Continued)

OTHER PUBLICATIONS

Megens, et al.; "High-Speed 32x32 MEMS Optical Phased Array", Proceedings of SPIE, vol. 8977, 2014, 7 pages total.
(Continued)

*Primary Examiner* — William R Alexander
*Assistant Examiner* — Henry A Duong
(74) *Attorney, Agent, or Firm* — Sughrue Mion, PLLC (57) ABSTRACT

A phase modulation active device and a method of driving the phase modulation active device are provided. The phase modulation active device includes channels independently modulating a phase of incident light. The method includes selecting a first phase value and a second phase value to be used for the channels, setting a binary phase profile by allocating the selected first phase value or the selected second phase value to each of the channels quasi-periodically, in a sequence in which the channels are arranged, and driving the phase modulation active device, based on the set binary phase profile.

21 Claims, 9 Drawing Sheets

(51) Int. Cl.
*G02F 1/00* (2006.01)
*G02F 1/03* (2006.01)

(58) Field of Classification Search
CPC .... G02F 1/1677; G02F 1/1679; G02F 1/1685; G02B 26/06; G01S 17/02; H04B 10/548
USPC .......................................................... 359/279
See application file for complete search history.

(56) References Cited

U.S. PATENT DOCUMENTS

| | | | |
|---|---|---|---|
| 2013/0215483 A1* | 8/2013 | Han | G02F 1/23 359/9 |
| 2013/0278912 A1* | 10/2013 | Owa | G02B 26/06 355/71 |
| 2016/0223723 A1 | 8/2016 | Han et al. | |

OTHER PUBLICATIONS

Mcmanamon, et al.; "A Review of Phased Array Steering for Narrow-Band Electrooptical Systems", Proceedings of the IEEE, vol. 97, No. 6, Jun. 2009, 19 pages total.

Kim, et al.; "Wide-Angle, Nonmechanical Beam Steering Using Thin Liquid Crystal Polarization Gratings", 12 pages total.

Van Putten, et al., "Spatial amplitude and phase modulation using commercial twisted nematic LCDs", Feb. 2008, Physics Optics, XP 080341204, 13 pages total.

Communication dated Jan. 24, 2018, issued by the European Patent Office in counterpart European Patent Application No. 17184396.4.

Kim, et al.; "Wide-Angle, Nonmechanical beam Steering using Thin Liquid Crystal Polarization Gratings", Proc. SPIE 7093, Advanced Wavefront Control: Methods, Devices, and Applications VI, 709302, Aug. 26, 2008, doi: 10.1117/12.795752, https://doi.org/10.1117/12. 795752. (12 pages total).

* cited by examiner

PHASE MODULATION ACTIVE DEVICE, METHOD OF DRIVING THE SAME, AND OPTICAL APPARATUS INCLUDING THE PHASE MODULATION ACTIVE DEVICE

CROSS-REFERENCE TO RELATED APPLICATION

This application claims priority from Korean Patent Application No. 10-2016-0116580, filed on Sep. 9, 2016, in the Korean Intellectual Property Office, the disclosure of which is incorporated herein by reference in its entirety.

BACKGROUND

1. Field

Apparatuses and methods consistent with example embodiments relate to a phase modulation active device, a method of driving the phase modulation active device, and an optical apparatus including the phase modulation active device.

2. Description of the Related Art

Optical elements that change transmission/reflection, polarization, a phase, intensity, and a path of incident light have been used in various optical devices. To control the above-listed characteristics of light in a desired manner in optical systems, optical modulators having various structures have been proposed.

For example, optically-anisotropic liquid crystals and microelectromechanical system (MEMS) structures using fine mechanical movement of light blocking/reflecting elements have been widely used in optical modulators of the related art. Such optical modulators have a long operation response time of several microseconds (µs) due to the nature of driving schemes of the optical modulators.

Attempts have recently been made to apply a meta structure to optical modulators. The meta structure is a structure in which a value smaller than a wavelength of incident light is applied to a thickness, a pattern, or a period. Optical modulation may be implemented in various forms by combining phase modulation types for incident light, and various optical characteristics may be achieved owing to high response speed. Thus, the meta structure may be favorably applied to ultra-micro devices.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide phase modulation active devices capable of implementing a desired optical performance in a combination of phase modulation forms and methods of driving the phase modulation active devices.

According to an aspect of an example embodiment, there is provided a method of driving a phase modulation active device including channels independently modulating a phase of incident light, the method including selecting a first phase value and a second phase value to be used for the channels, setting a binary phase profile by allocating the selected first phase value or the selected second phase value to each of the channels quasi-periodically, in a sequence in which the channels are arranged, and driving the phase modulation active device, based on the set binary phase profile.

The setting of the binary phase profile may include repeating a process of allocating the selected first phase value to one or more first adjacent channels among the channels, and allocating the selected second phase value to one or more second adjacent channels among the channels, and the method may further include adjusting an optical performance of the phase modulation active device, based on an average value of periods in which an arrangement pattern of the selected first phase value and the selected second phase value is repeated.

The setting of the binary phase profile may further include setting the binary phase profile so that the phase modulation active device steers the incident light by θ, based on an equation, $$\sin\theta = \frac{\lambda}{\langle T_k \rangle}.$$

$\lambda$ may denote a wavelength of the incident light, $T_k$ may denote a kth period in which the arrangement pattern of the selected first phase value and the selected second phase is repeated, and $\langle T_k \rangle$ may denote the average value of the periods.

A difference between the selected first phase value and the selected second phase value may be π.

The setting of the binary phase profile may include setting a full phase profile having a phase value range from 0 to 2π to implement an optical performance of the phase modulation active device, and correcting a phase value included in the full phase profile as the selected first phase value or the selected second phase value.

The correcting of the phase value may include, in response to the phase value being in first range, correcting the phase value as the selected first phase value, and in response to the phase value being outside first range, correcting the phase value as the selected second phase value.

According to an aspect of an example embodiment, there is provided a phase modulation active device including a phase modulator including channels configured to independently modulate a phase of incident light, a signal inputter configured to apply an input signal for phase modulation to each of the channels, a binary setter configured to select a first phase value and a second phase value to be used for the channels, and set a binary phase profile by allocating the selected first phase value or the selected second phase value to each of the channels quasi-periodically, in a sequence in which the channels are arranged, and a controller configured to control the signal inputter, based on the set binary phase profile.

The binary setter may be further configured to repeat a process of allocating the selected first phase value to one or more first adjacent channels among the channels, and allocating the selected second phase value to one or more second adjacent channels among the channels, and adjust an optical performance of the phase modulation active device, based on an average value of periods in which an arrangement pattern of the selected first phase value and the selected second phase value is repeated.

The binary setter may be further configured to set the binary phase profile so that the phase modulation active device steers the incident light by θ, based on an equation, $$\sin\theta = \frac{\lambda}{\langle T_k \rangle}.$$

λ may denote a wavelength of the incident light, $T_k$ may denote a kth period in which the arrangement pattern of the selected first phase value and the selected second phase is repeated, and $\langle T_k \rangle$ may denote the average value of the periods.

The binary setter may be further configured to set a full phase profile having a phase value range from 0 to $2\pi$ to implement an optical performance of the phase modulation active device, and correct a phase value included in the full phase profile as the selected first phase value or the selected second phase value.

The binary setter may be further configured to in response to the phase value being in first range, correct the phase value as the selected first phase value, and in response to the phase value being outside the first range, correct the phase value as the selected second phase value.

A difference between the selected first phase value and the selected second phase value may be π, and the first range may be $\pi/2$ to $3\pi/2$.

The phase modulator may include an active layer having an optical property changing based on an electrical signal, a nano array layer adjacent to the active layer, and including nano structures, and an electrode layer configured to apply the electrical signal to the active layer.

Each of the nano structures may have a shape having a dimension smaller than a wavelength of the incident light.

The nano structures may include a metallic material.

The signal inputter may be further configured to apply a voltage between each of the nano structures and the electrode layer.

The nano structures may include a dielectric material.

The phase modulation active device may further include a conductive layer interposed between the nano array layer and the active layer, and the signal inputter may be further configured to apply a voltage between the conductive layer and the electrode layer.

According to an aspect of an example embodiment, there is provided a lidar apparatus including a light source configured to emit light, and a phase modulation active device configured to steer the emitted light to an object, and including a phase modulator including channels configured to independently modulate a phase of incident light, a signal inputter configured to apply an input signal for phase modulation to each of the channels, a binary setter configured to select a first phase value and a second phase value to be used for the channels, and set a binary phase profile by allocating the selected first phase value or the selected second phase value to each of the channels quasi-periodically, in a sequence in which the channels are arranged, and a controller configured to control the signal inputter, based on the set binary phase profile. The lidar apparatus further includes a sensor configured to receive the light steered to the object and reflected from the object.

The binary setter may be further configured to set binary phase profiles respectively implementing steering angles so that the phase modulation active device is configured to scan the object, and the controller may be further configured to time-sequentially control the signal inputter, based on the set binary phase profiles.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

It will be understood that when a layer, region, or component is referred to as being "formed on," another layer, region, or component, it can be directly or indirectly formed on the other layer, region, or component.

As used herein, the singular forms are intended to include the plural forms as well, unless the context clearly indicates otherwise. It will be further understood that the terms "comprises" and/or "comprising" used herein specify the presence of stated features or components, but do not preclude the presence or addition of one or more other features or components.

As used herein, the use of the term "the" and similar indication terms correspond to the singular and plural forms.

Operations constituting a method may be performed in an appropriate order, unless operations clearly indicate otherwise. The method is not limited to the order of operations described herein. The use of any and all examples, or example language (e.g., "such as") provided herein, is intended to better illuminate the underlying concept and does not pose a limitation on the scope of the disclosure.

In addition, the terms such as "unit," "-er (-or)," and "module" described in the specification refer to an element for performing at least one function or operation, and may be implemented in hardware, software, or the combination of hardware and software.

Figure 1:
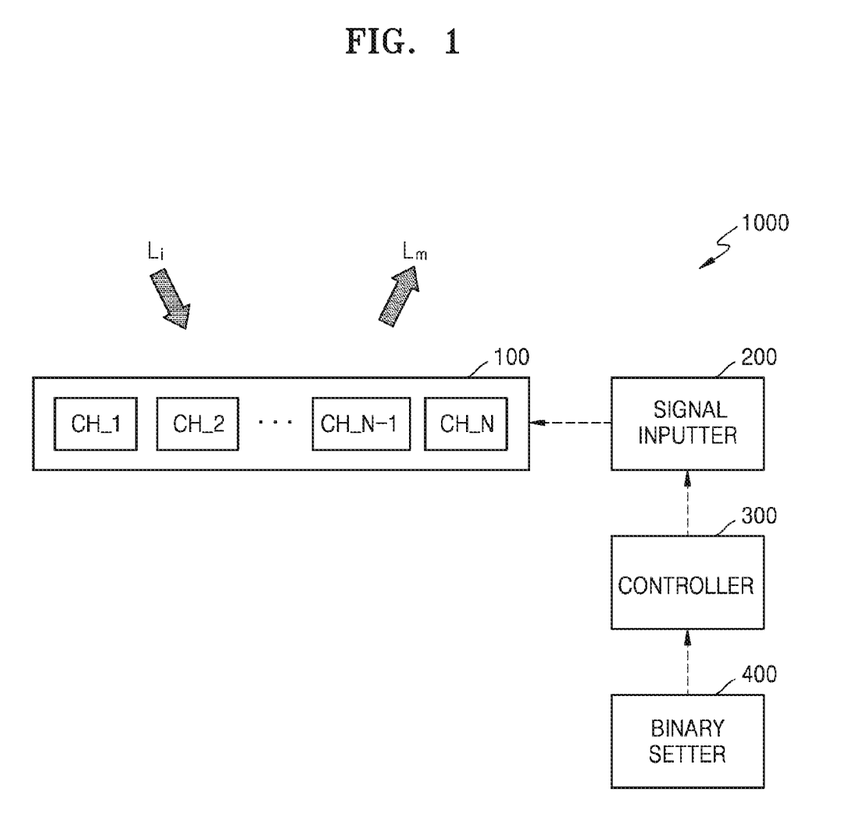
FIG. 1 is a block diagram of a schematic configuration of a phase modulation active device according to an example embodiment.
Figure 2:
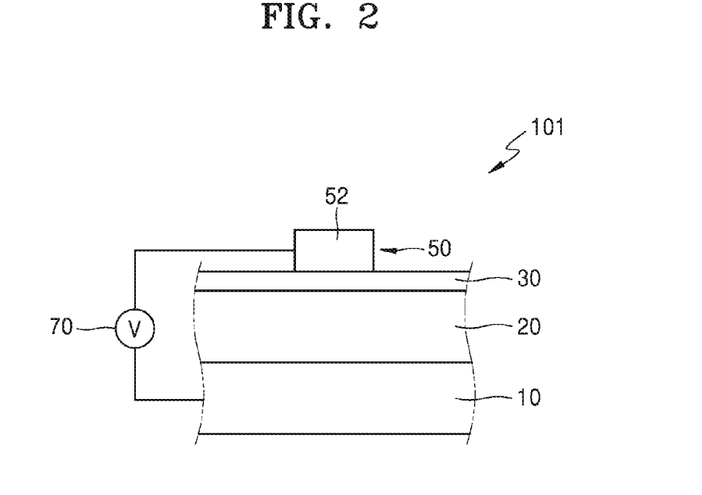
FIG. 2 is a cross-sectional view of an example of a configuration of a phase modulator that may be employed in the phase modulation active device of FIG. 1.
Figure 3:
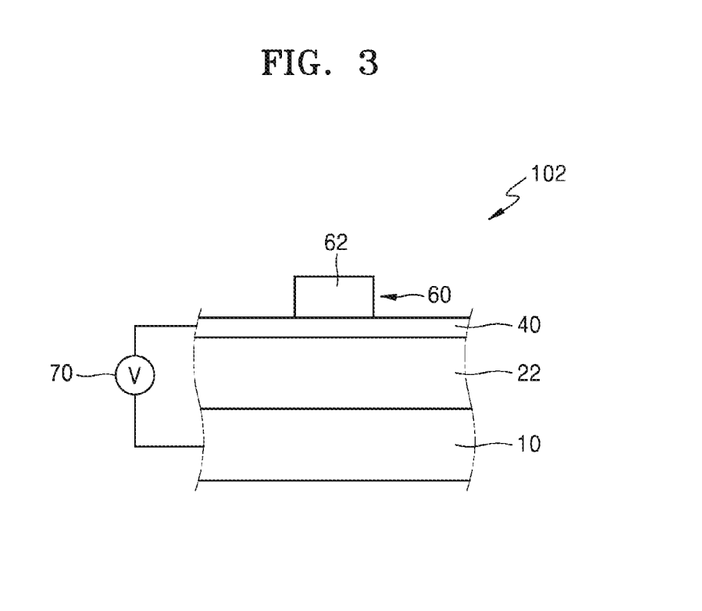
FIG. 3 is a cross-sectional view of another example of a configuration of a phase modulator that may be employed in the phase modulation active device of FIG. 1.

FIG. 1 is a block diagram of a schematic configuration of a phase modulation active device 1000 according to an example embodiment. FIG. 2 is a cross-sectional view of an example of a configuration of a phase modulator 101 that may be employed in the phase modulation active device 1000 of FIG. 1, and FIG. 3 is a cross-sectional view of another example of a configuration of a phase modulator 102 that may be employed in the phase modulation active device 1000 of FIG. 1.

The phase modulation active device 1000 may include a phase modulator 100 including a plurality of channels CH_1 through CH_N that modulate a phase of an incident light, a signal inputter 200 that applies an input signal for phase modulation to each of the plurality of channels CH_1 through CH_N, a binary setter 400 that sets a binary phase profile configured by using two phase values, and a controller 300 that controls the signal inputter 200 according to the binary phase profile.

The phase modulator 100 may include the plurality of channels CH_1 through CH_N to independently modulate a phase of incident light Li. The phase modulator 100 may include an active layer having optical properties that change with an applied signal and a plurality of nano structures adjacent to the active layer. Each of the plurality of nano structures may form the plurality of channels CH_1 through CH_N. A detailed example of a structure of the phase modulator 100 will be described with reference to FIGS. 2 and 3. Each of the plurality of channels CH_1 through CH_N may modulate a phase of the incident light $L_i$ according to a signal applied thereto from the signal inputter 200. The input signal from the signal inputter 200 may be determined according to a detailed structure of the phase modulator 100, e.g., materials of the active layer and the nano structure adopted in the phase modulator 100. If the phase modulator 100 adopts a material having optical properties that change with an electric signal, the signal inputter 200 may be configured to apply an electric signal, e.g., a voltage, to the phase modulator 100. The incident light $L_i$ may be output as modulated light $L_m$ in various forms by properly controlling regularity for modulating a phase in each of the plurality of channels CH_1 through CH_N of the phase modulator 100. The phase modulator 100 may perform, for example, beam steering, focusing, defocusing, beam shaping, beam splitting, or the like, with respect to the incident light L.

The binary setter 400 may set a phase to be modulated by each of the channels CH_1 through CH_N to implement a target performance of the phase modulator 100. In this regard, two phase values φ1 and φ2 may be used to regulate rules that allocate the phase values φ1 and φ2 to each of the channels CH_1 through CH_N, and thus the binary setter 400 may set a binary phase profile to implement the target optical performance. For example, a method of arranging the two phase values φ1 and φ2 as many times as the number of the plurality of channels CH_1 through CH_N quasi-periodically and allocating the two phase values φ1 and φ2 in a sequence in which the plurality of channels CH_1 through CH_N are arranged may be used. In this regard, when the two phase values φ1 and φ2 are repeated at a predetermined period, a quasi-periodic arrangement may include arrangements of a case in which a first period, a second period, . . . , and a kth period are the same; a case in which some of them are the same while the others are not the same; and a case in which all of them are different.

In an example embodiment, configurations of the phase modulator 100 and the signal inputter 200 may be simplified by using driving according to the binary phase profile that uses only the two phase values φ1 and φ2. The two phase values φ1 and φ2 may be determined as numerical values that are easily implemented by each of the channels CH_1 through CH_N, for example, numerical values smaller than a phase limit value.

Driving using only the two phase values φ1 and φ2 may reduce intensity indicating a desired optical performance compared to a driving using setting of a phase value implemented by each channel of the phase modulator 100 as various numerical values from 0° to 360°. However, in actual channel driving, although strength of an input signal increases, a phase modulation value may no longer increase due to a phase limit, and thus a process of correcting a target phase of a channel may be performed. In the present example embodiment, two phase values among available phase values that may be indicated by each of the channels CH_1 through CH_N may be used, and an optical performance may be adjusted according to an arrangement rule of the two phase values, which enables driving without requiring separate phase correction.

A method of setting the binary phase profile will be described in more detail with reference to FIGS. 4 through 7.

The controller 300 may control the signal inputter 200 according to the binary phase profile set by the binary setter 400 such that the channels CH_1 through CH_N are independently controlled.

Referring to FIGS. 2 and 3, a detailed configuration of the phase modulators 101 and 102 adoptable in the phase modulation active device 1000 of FIG. 1 will now be described.

Referring to FIG. 2, the phase modulator 101 may include an active layer 20, a nano array layer 50 in which a conductive nano structure 52 is arrayed, and an electrode layer 10 for applying a signal to the active layer 20. The active layer 20 may include a material having optical properties that change with signal application. The active layer 20 may include, for example, a material having a permittivity that changes with an electric field. The nano array layer 50 may include a plurality of nano structures 52. In the drawings, one nano structure 52 forming one channel is illustrated. An insulating layer 30 may be further disposed between the nano array layer 50 and the active layer 20.

The nano structure 52 may have a shape having dimensions of a sub-wavelength. In this regard, the sub-wavelength means dimensions smaller than an operation frequency of the phase modulator 101, i.e., the incident light $L_i$ to be modulated. One dimension of the shape of the nano structure 52, e.g., any one or any combination of a thickness, a width, and a length, may have a dimension of the sub-wavelength.

The conductive material adopted in the nano structure 52 may include a high-conductivity metallic material in which surface plasmon excitation may occur. For example, at least one selected from Cu, Al, Ni, Fe, Co, Zn, Ti, ruthenium (Ru), rhodium (Rh), palladium (Pd), white gold (Pt), silver (Ag), osmium (Os), iridium (Ir), and gold (Au) may be adopted, or an alloy including any one or any combination of them may also be adopted. A two-dimensional (2D) material having superior conductivity such as graphene, or a conductive oxide may be used.

The active layer 20 may include a material having optical characteristics that change with an external signal. The external signal may be an electric signal. The active layer 20 may include a transparent conductive oxide (TCO) such as indium tin oxide (ITO), indium zinc oxide (IZO), aluminum zinc oxide (AZO), gallium zinc oxide (GZO), or the like. A transition metal nitride such as TiN, ZrN, HfN, or TaN may also be included in the active layer 20. An electro-optic material having an effective permittivity that changes with application of an electric signal, i.e., LiNbO3, LiTaO3, KTN (potassium tantalate niobate), PZT (lead zirconate titanate), etc., may also be used. Various polymer materials having electro-optic characteristics may be used.

The electrode layer 10 may include various materials having conductivity. The electrode layer 10 may include at least any one selected from Cu, Al, Ni, Fe, Co, Zn, Ti, ruthenium (Ru), rhodium (Rh), palladium (Pd), white gold (Pt), silver (Ag), osmium (Os), iridium (Ir), and gold (Au). If the electrode layer 10 includes a metallic material, the electrode layer 10 may function as a reflective layer for reflecting light as well as to apply a voltage. The electrode layer 10 may include a TCO such as ITO, IZO, AZO, GZO, or the like.

The nano structure 52 may modulate a phase of light having a wavelength using surface plasmon resonance occurring in a boundary between the metallic material and a dielectric material. The output phase value may be related to a detailed shape of the nano structure 52. The output phase value may be adjusted by a change of the optical properties of the active layer 20 due to a voltage applied between the nano structure 52 and the electrode layer 10 by a voltage source 70.

Referring to FIG. 3, the phase modulator 102 may include an active layer 22, a nano array layer 60 in which a dielectric nano structure 62 is arrayed, and an electrode layer 10 for applying a signal to the active layer 22. The active layer 22 may include a material having optical properties that change with signal application, for example, a material having a permittivity that changes with an electric field. The nano array layer 60 may include a plurality of nano structures 62, and in the drawings, one nano structure 62 forming one channel is illustrated. A conductive layer 40 may be further disposed between the nano array layer 60 and the active layer 22.

The active layer 22 may include an electro-optic material having a refractive index that changes with an effective permittivity that changes with application of an electric signal. As the electro-optic material, LiNbO3, LiTaO3, KTN (potassium tantalate niobate), PZT (lead zirconate titanate), etc., may be used. Various polymer materials having electro-optic characteristics may also be used.

The electrode layer 10 may include various materials having conductivity. The electrode layer 10 may include at least one selected from Cu, Al, Ni, Fe, Co, Zn, Ti, ruthenium (Ru), rhodium (Rh), palladium (Pd), white gold (Pt), silver (Ag), osmium (Os), iridium (Ir), and gold (Au). If the electrode layer 10 includes a metallic material, the electrode layer 10 may function as a reflective layer for reflecting light as well as to apply a voltage. The electrode layer 10 may include a TCO such as ITO, IZO, AZO, GZO, or the like.

The nano structure 62 may have a shape having dimensions of a sub-wavelength. The nano structure 62 may include a dielectric material to modulate a phase of light having a wavelength by using Mie resonance caused by displacement current. To this end, the nano structure 62 may include a dielectric material having a refractive index higher than that of the active layer 22, for example, a material having a refractive index higher than the highest value in a range in which the refractive index of the active layer 22 changes by application of a voltage. The phase value output by the nano structure 62 may be related to a detailed structure of the nano structure 62. The output phase value from the nano structure 62 may be adjusted by a change of the optical properties of the active layer 10 due to a voltage applied between the conductive layer 40 and the electrode layer 10 by a voltage source 70.

FIGS. 2 and 3 illustrate example configurations in the phase modulators 101 and 102, respectively. The phase modulator 100 of the phase modulation active device 1000 of FIG. 1 is not limited to the example configurations. Modifications of the example configurations may be adopted in the phase modulation active device 1000.

Figure 4:
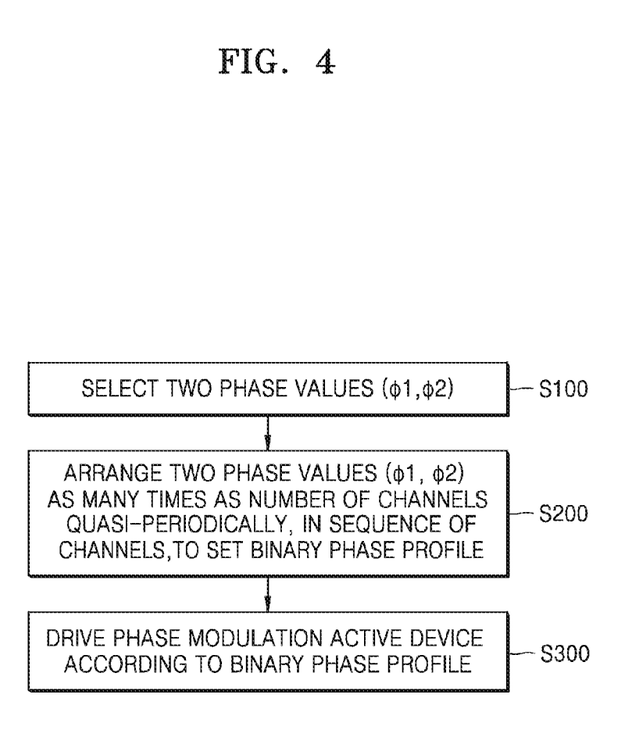
FIG. 4 is a flowchart schematically describing a method of driving a phase modulation active device, according to an example embodiment.
Figure 5:
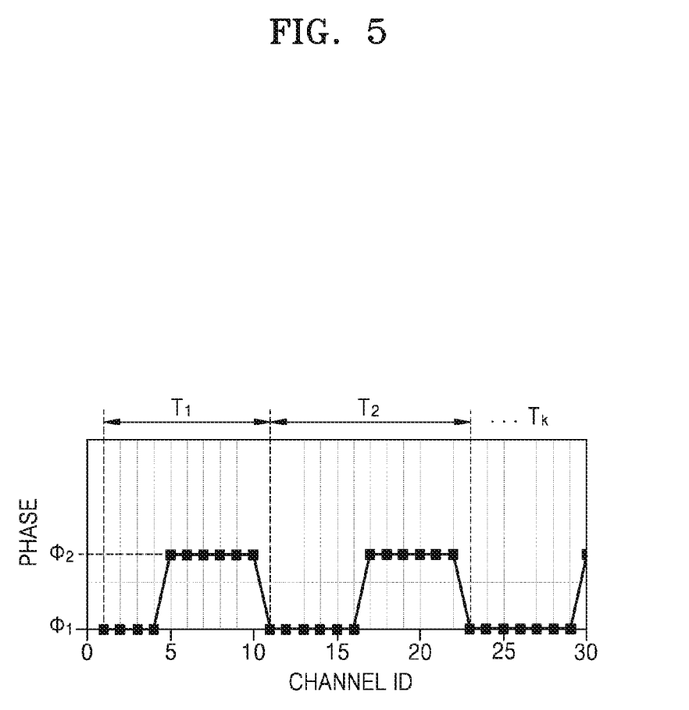
FIG. 5 is a diagram illustrating an example of a binary phase profile set by using the method of driving the phase modulation active device of FIG. 4.

FIG. 4 is a flowchart for schematically describing a method of driving a phase modulation active device, according to an example embodiment. FIG. 5 is a diagram illustrating an example of a binary phase profile set by using the method of driving the phase modulation active device of FIG. 4.

Referring to FIG. 4, the two phase values $\varphi 1$ and $\varphi 2$ that are to be used as phase values in a plurality of channels included in the phase modulation active device may be selected (operation S100). The two phase values $\varphi 1$ and $\varphi 2$ may be phase values that may be implemented by each channel included in the phase modulation active device and may use values from 0 to $2\pi$. Taking into consideration that there may be a phase limit, the two phase values $\varphi 1$ and $\varphi 2$ may be selected as numeral values smaller than a phase limit value of each channel. A difference $|\varphi 1-\varphi 2|$ between the two phase values $\varphi 1$ and $\varphi 2$ may be $\pi$. For example, $\varphi 1$ and $\varphi 1+\pi$ may be selected as the two phase values $\varphi 1$ and $\varphi 2$. The two phase values $\varphi 1$ and $\varphi 2$ may be 0 and $\pi$.

To set the binary phase profile, the selected two phase values $\varphi 1$ and $\varphi 2$ may be arranged as many times as the channel number of the phase modulation active device quasi-periodically and may be allocated in a sequence in which a plurality of channels are arranged (operation S200). In this regard, a quasi-periodic arrangement may mean that not all the periods at which the two phase values $\varphi 1$ and $\varphi 2$ are repeated are the same.

The phase modulation active device is driven according to the set binary phase profile (operation S300).

Referring to the binary phase profile of FIG. 5, a process of setting the phase value $\varphi 1$ with respect to one or more channels adjacent to the plurality of channels included in the phase modulation active device and setting the phase value $\varphi 2$ with respect to next adjacent one or more channels may be repeated, and thus periods $(T_k)(k=1, 2, \ldots)$ at which an arrangement pattern of the two phase values $\varphi 1$ and $\varphi 2$ is repeated may be set. A desired optical performance may be adjusted according to an average value $<T_k>$ of the periods $(T_k)$.

A numerical value of each of the periods $(T_k)$ at which the arrangement pattern of the two phase values $\varphi 1$ and $\varphi 2$ is repeated may have a discrete value such as an integer multiple of a size d of a channel while the average value $<T_k>$ of the periods $(T_k)$ may have various and continuous values. Thus, the desired optical performance may be easily adjusted through a group of differently adjusted values of the periods $(T_k)$ for each period sequence rather than setting the periods $(T_k)$ as the same value, i.e., by using a method of adjusting the average value $<T_k>$.

A method in which the phase modulation active device implements a beam steering angle θ in this way will now be described.

The beam steering angle θ may be implemented when a plurality of adjacent channels indicate a linearly increasing phase. When Δφ denotes a phase difference between the adjacent channels and d denotes a channel width, light of a wavelength A may be steered in a direction of the angle θ defined below.

$$\sin\theta = \frac{\Delta\phi}{2\pi}\frac{\lambda}{d} \quad \text{[Equation 1]}$$

In the present example embodiment in which only the two phase values φ1 and φ2 are used, Equation 1 above may be expressed below in which Δφ denotes a difference between the two phase values φ1 and φ2, for example, π, and 2 d denotes the average value $<T_k>$ of the periods ($T_k$) at which the arrangement pattern of the two phase values φ1 and φ2 is repeated.

$$\sin\theta = \frac{\lambda}{\langle T_k \rangle} \quad \text{[Equation 2]}$$

When the steering angle θ is adjusted according to Equation 2 above, a method of adjusting $<T_k>$ having a continuous value while using only the two phase values φ1 and φ2 may be used, and thus the steering angle θ may be expressed in various ways. According to the method above, scanning of a desired angle range may be easily implemented.

Figure 6:
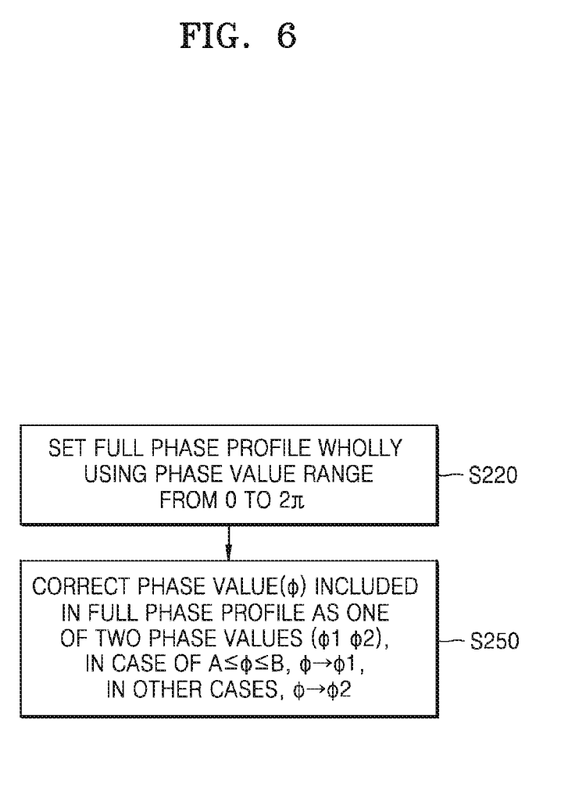
FIG. 6 is a flowchart for describing a detailed example of setting a binary phase profile in the flowchart of FIG. 4.
Figure 7:
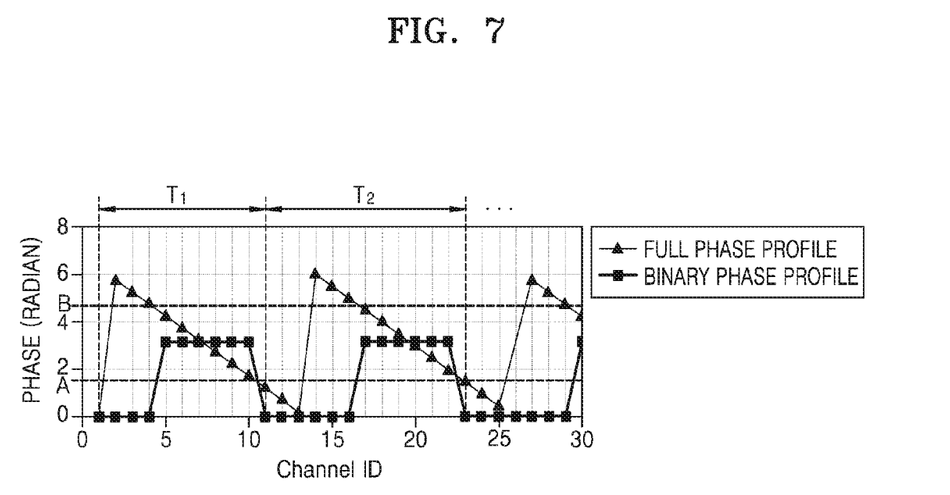
FIG. 7 is a graph of an example of correcting a full phase profile to the binary phase profile set according to the flowchart of FIG. 6.

FIG. 6 is a flowchart describing a detailed example of setting a binary phase profile in the flowchart of FIG. 4. FIG. 7 is a graph of an example of correcting a full phase profile to the binary phase profile set according to the flowchart of FIG. 6.

To set the binary phase profile, the full phase profile may be set (operation S220). The full phase profile is a phase profile that wholly uses a phase value range from 0 to 2π to implement a target optical performance.

Phase values included in the full phase profile may be corrected as one of the determined two phase values φ1 and φ2 (operation S250). For example, in a case in which the phase value φ1 appearing in the full phase profile satisfies a first continuous range such as A≤φ≤B, a phase value included in the full phase profile may be corrected as the phase value φ1, and in other cases, the phase value may be corrected as the phase value φ2.

FIG. 7 illustrates the example in which the full phase profile is corrected as the binary phase profile. In the graph, a rule, which states that A is π/2, B is 3π/2, φ1 is 0, and φ2 is π, is applied to correct the full phase profile as the binary phase profile. That is, when the phase value included in the full phase profile is π/2≤φ≤3π/2, the phase value may be corrected as π, and other phase values may be corrected as 0.

The rule is an example. To adjust the average value $<T_k>$ of the periods ($T_k$), other modified rules may be applied.

Figure 8:
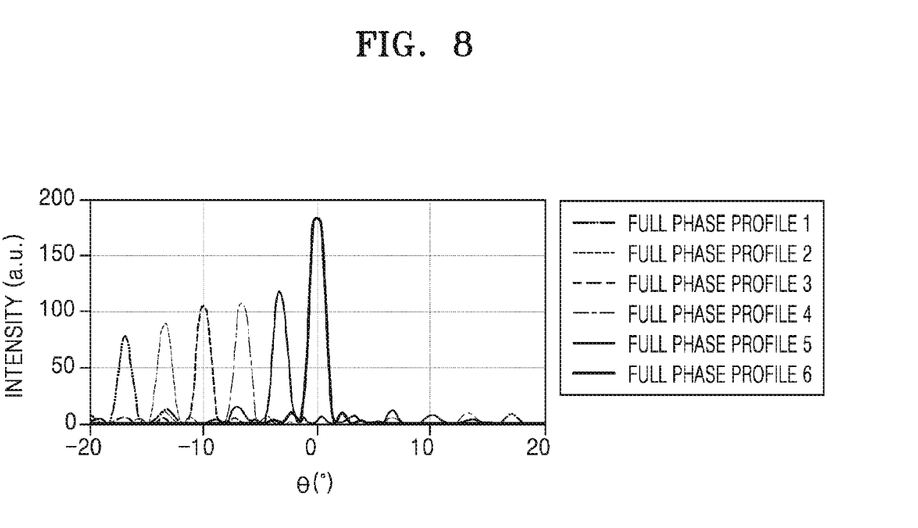
FIG. 8 is a graph of an example of a plurality of steering angles implemented according to a plurality of full phase profiles, according to an example embodiment.

FIG. 8 is a graph of an example of a plurality of steering angles θ implemented according to a plurality of full phase profiles, according to an example embodiment.

The plurality of full phase profiles may be used to implement the plurality of steering angles θ. The graph shows that a peak value of light intensity appears at a designed steering angle according to each of the full phase profiles.

Figure 9:
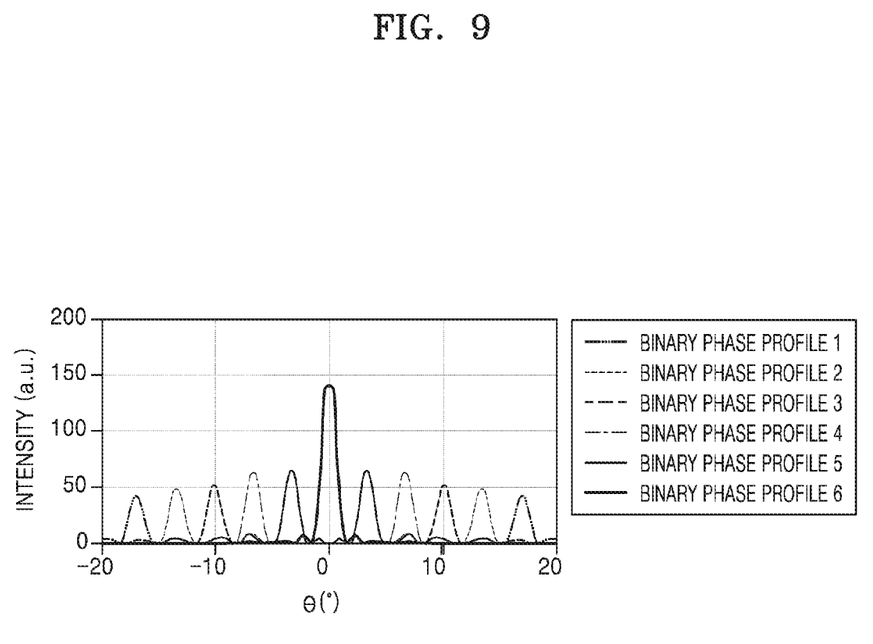
FIG. 9 is a graph of an example of a plurality of steering angles implemented by setting a plurality of binary phase profiles by using a method of driving a phase modulation active device, according to an example embodiment.

FIG. 9 is a graph of an example of a plurality of steering angles implemented by setting a plurality of binary phase profiles by using a method of driving a phase modulation active device, according to an example embodiment.

In the graph, unlike FIG. 8 in which full phase profiles are used, when one binary phase profile is applied, a peak value of light intensity has a value about half of those of the full phase profiles and appears at two locations because the binary phase profile using two phase values has a symmetrical shape. That is, when a binary phase profile is designed to indicate the steering angle θ, an incident light may be steered at two locations of θ and −θ, and thus light intensity may be halved.

When a binary phase profile is used, although light intensity may be reduced, a size of a channel may be reduced and a driving method may be simplified as compared to when forming each channel to implement a phase change having a range from 0 to 2π. When a predetermined scan region is scanned, a property in which a beam peak appears at two locations may be utilized to increase a scanning speed.

The method of driving the phase modulation active device described above is described by using a binary phase profile that performs a beam steering function, but the inventive concept is not limited thereto. Various optical performances may be achieved by appropriately setting an arrangement pattern of two phase values. For example, the phase modulation active device 1000 may be applied as a beam splitter that splits incident light in various directions, as a beam shaper that performs beam shaping, or as a beam steering device that steers light in a desired direction. The phase modulation active device 1000 may be used in various optical systems using a beam splitter, a beam shaper, a beam steering device, or the like. The phase modulation active device 1000 may also actively adjust performance, e.g., steering direction adjustment, and thus the phase modulation active device 1000 may perform a function such as beam scanning. The phase modulation active device 1000 may be applied as a refractive optical lens capable of focusing or defocusing, and may be applied to various optical systems using such an optical lens. The phase modulation active device 1000 may also actively adjust performance, and thus the phase modulation active device 1000 may perform a function such as variable focusing.

Figure 10:
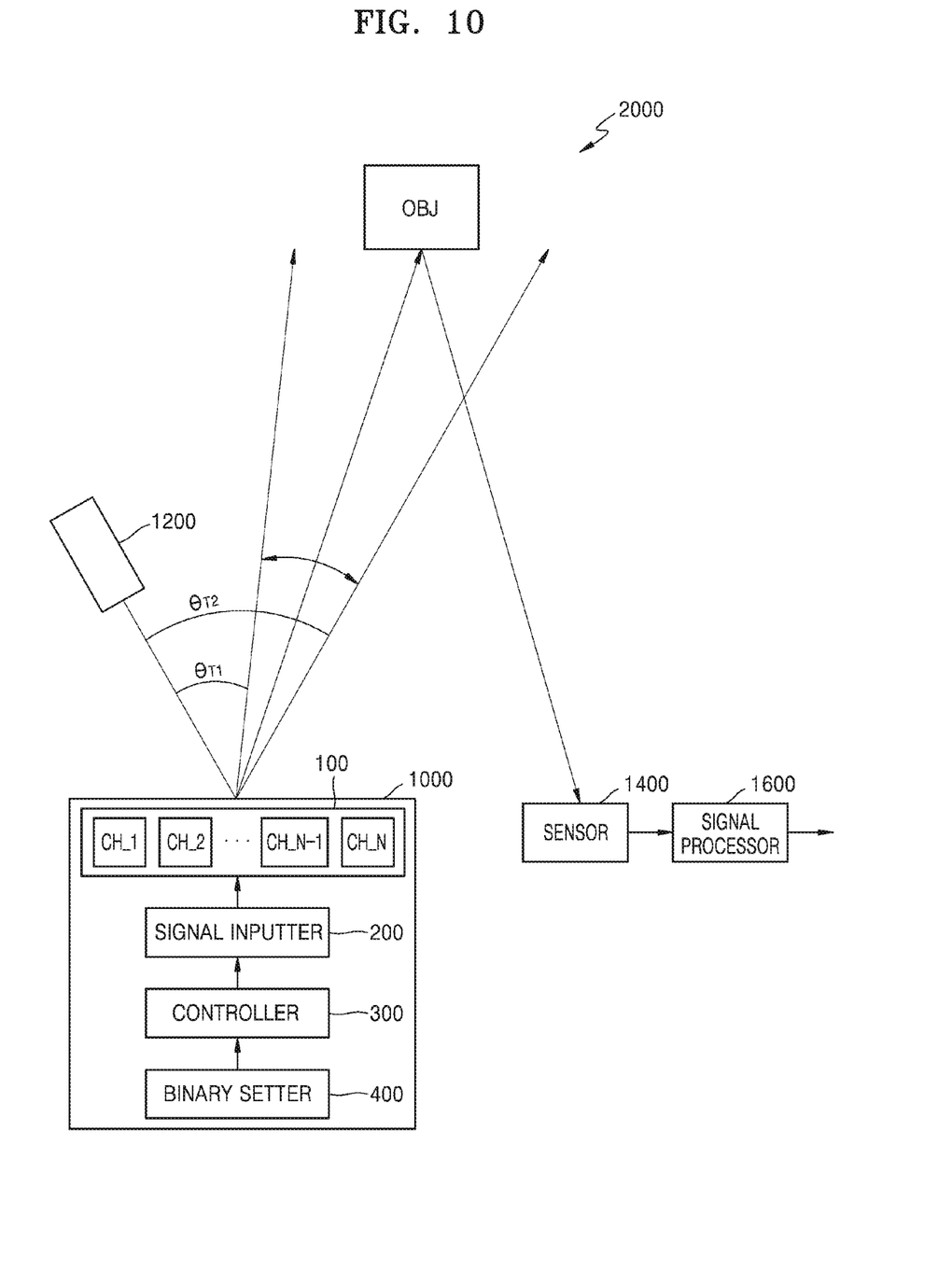
FIG. 10 is a block diagram of a schematic configuration of a lidar apparatus according to an example embodiment.

FIG. 10 is a block diagram of a schematic configuration of a lidar apparatus 2000 according to an example embodiment.

The lidar apparatus 2000 may include a light source 1200 that irradiates light, the phase modulation active device 1000 that steers the light irradiated from the light source 1200 toward an object OBJ, and a sensor 1400 that senses light reflected from the object OBJ.

The light source 1200 may irradiate light to be used to analyze a location and a shape of the object OBJ. The light source 1200 may include a light source that generates and irradiates light having a wavelength. The light source 1200 may include a light source such as a laser diode (LD), a light-emitting diode (LED), a super luminescent diode (SLD), or the like, which generates and irradiates light having a wavelength band suitable for the analysis of the position and the shape of the object OBJ, e.g., light having an infrared wavelength. The light source 1200 may generate and irradiate light in a plurality of different wavelength bands. The light source 1200 may generate and irradiate pulse light or continuous light.

The phase modulation active device 1000 may include the phase modulator 100 including the plurality of channels CH_1 through CH_N that independently modulate a phase of incident light, the signal inputter 200 that applies an input signal for phase modulation to each of the plurality of channels CH_1 through CH_N, the binary setter 400 that sets a binary phase profile configured by using two phase values, and the controller 300 that controls the signal inputter 200 according to the binary phase profile. The phase modulator 100 may have a configuration of the phase modulators 101 and 102 described above.

Between the light source 1200 and the phase modulation active device 1000 and/or between the phase modulation active device 1000 and the object OBJ, other optical members, for example, members for adjusting a path of light irradiated from the light source 1200, splitting a wavelength of the irradiated light, or performing additional modulation, may be further disposed.

The binary setter 400 may set a binary phase profile that uses two phase values so that the phase modulation active device 1000 performs a beam steering function. The binary setter 400 may set a plurality of binary phase profiles that respectively implement a plurality of steering angles so that the phase modulation active device 1000 scans the object OBJ. The plurality of steering angles may be determined to cover a range of $\theta_{T1}$ to $\theta_{T2}$. As described in Equation 2 above, the binary setter 400 may set the steering angles by adjusting <Tk> to have continuous values, thereby implementing a desired angle during a scanning operation.

The controller 300 may control the signal inputter 200 to apply an appropriate input signal to the plurality of channels CH_1 through CH_N according to the binary phase profiles set by the binary setter 400. That is, the controller 300 may time-sequentially control the signal inputter 200 according to the set binary phase profiles.

When the phase modulation active device 1000 scans the range of $\theta_{T1}$ to $\theta_{T2}$ of the steering angles, an optical signal sensed by the sensor 1400 may be used to analyze whether the object OBJ is present, a location of the object OBJ, a shape thereof, etc.

The sensor 1400 may include an array of a plurality of sensors for optical detection that senses light reflected from the object OBJ. The sensor 1400 may also include arrays of sensors capable of sensing light having different wavelengths.

The lidar apparatus 2000 may further include a signal processor 1600. The signal processor 1600 may perform a predetermined operation, for example, an operation for measuring a time of flight from the optical signal detected by the sensor 1400, and performs three-dimensional (3D) shape identification based on the operation. The signal processor 1600 may use various operation methods. For example, the signal processor 1600 may use direct time measurement, wherein when pulse light is irradiated to the object OBJ, the time taken for the light to arrive after being reflected from the object OBJ is measured by using a timer, and thus a distance is calculated based on the measured time. A correlation method maybe be used, wherein when the pulse light is irradiated to the object OBJ, distance is calculated based on a measurement of brightness of the light reflected from the object OBJ. Phase delay measurement may be used, wherein when light is irradiated having a continuous wave, such as a sine wave, to the object OBJ, a phase difference of the light reflected from the object OBJ is sensed, and thus the phase difference is converted into a distance. The signal processor 1600 may include a memory in which a program used for the operation and other data are stored.

The signal processor 1600 may transmit an operation result, i.e., information about the shape and location of the object OBJ, to another unit. For example, the information may be transmitted to a driving controller or an alert system, etc., of a self-driving device employing the lidar apparatus 2000.

The lidar apparatus 2000 may be used as a sensor for obtaining 3D information about a front object in real time, and thus may be applicable to a self-driving device, e.g., a unmanned vehicle, a self-driving vehicle, a robot, a drone, etc.

The lidar apparatus 2000 may also be applied to a black box or the like as well as the self-driving device, to identify front or rear obstacles at nighttime when objects are difficult to identify with an image sensor.

Figure 11:
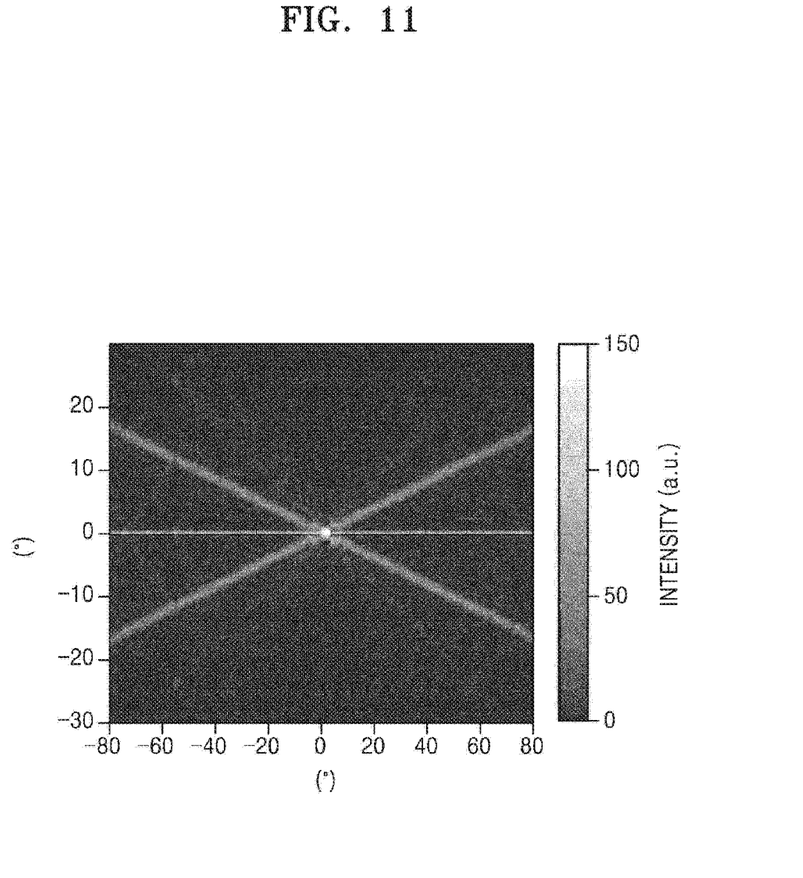
FIG. 11 is a diagram illustrating a beam distribution of an example of scanning a predetermined angle range in the lidar apparatus of FIG. 10.

FIG. 11 is a diagram illustrating a beam distribution of an example of scanning a predetermined angle range in the lidar apparatus of FIG. 10.

Two bright lines of FIG. 11 may be scan lines. This may be a result of, as described with reference to FIG. 9 above, steering a beam in a direction of $-\theta$ by using a binary phase profile that designs the steering angle $\theta$. As such, when the object OBJ is scanned along one scan line, two scan lines may be formed, which may advantageously reduce a total time taken to scan the object OBJ.

According to the method of driving the phase modulation active device described above, a binary phase profile using only two phase values may be set, and the phase modulation active device may be driven according to the binary phase profile. Thus, an increase in a device area for a big phase change or a driving signal of high precision may not be required, and a phase limit may be overcome.

The phase modulation active device described above may actively control an optical modulation performance according to an arrangement of phase values of a binary phase profile and achieve a good optical modulation performance, and thus the phase modulation active device may be suitably applied to various optical apparatuses.

In addition, the example embodiments may also be implemented through computer-readable code and/or instructions on a medium, e.g., a computer-readable medium, to control at least one processing element to implement any above-described example embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to example embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

It may be understood that example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A method of driving a phase modulation active device comprising channels independently modulating a phase of incident light, the method comprising:
   selecting a first phase value and a second phase value to be used for the channels;
   setting a binary phase profile by allocating the selected first phase value or the selected second phase value to each of the channels at irregular periods, in a sequence in which the channels are arranged; and
   driving the phase modulation active device, based on the set binary phase profile.

2. The method of claim 1, wherein the setting of the binary phase profile comprises:
   repeating a process of allocating the selected first phase value to one or more first adjacent channels among the channels, and allocating the selected second phase value to one or more second adjacent channels among the channels, and
   the method further comprises adjusting an optical performance of the phase modulation active device, based on an average value of periods in which an arrangement pattern of the selected first phase value and the selected second phase value is repeated.

3. The method of claim 2, wherein the setting of the binary phase profile further comprises setting the binary phase profile so that the phase modulation active device steers the incident light by θ, based on an equation, $$\sin\theta = \frac{\lambda}{\langle T_k \rangle},$$

wherein λ, denotes a wavelength of the incident light, $T_k$ denotes a kth period in which the arrangement pattern of the selected first phase value and the selected second phase is repeated, and $\langle T_k \rangle$ denotes the average value of the periods.

4. The method of claim 1, wherein a difference between the selected first phase value and the selected second phase value is π.

5. The method of claim 1, wherein the setting of the binary phase profile comprises:
   setting a full phase profile having a phase value range from 0 to 2π to implement an optical performance of the phase modulation active device; and
   correcting a phase value included in the full phase profile as the selected first phase value or the selected second phase value.

6. The method of claim 5, wherein the correcting of the phase value comprises:
   in response to the phase value being in first range, correcting the phase value as the selected first phase value; and
   in response to the phase value being outside the first range, correcting the phase value as the selected second phase value.

7. A phase modulation active device comprising:
   a phase modulator comprising channels configured to independently modulate a phase of incident light;
   a signal inputter configured to apply an input signal for phase modulation to each of the channels;
   a binary setter configured to:
     select a first phase value and a second phase value to be used for the channels; and
     set a binary phase profile by allocating the selected first phase value or the selected second phase value to each of the channels at irregular periods, in a sequence in which the channels are arranged; and
   a controller configured to control the signal inputter, based on the set binary phase profile.

8. The phase modulation active device of claim 7, wherein the binary setter is further configured to:
   repeat a process of allocating the selected first phase value to one or more first adjacent channels among the channels, and allocating the selected second phase value to one or more second adjacent channels among the channels; and
   adjust an optical performance of the phase modulation active device, based on an average value of periods in which an arrangement pattern of the selected first phase value and the selected second phase value is repeated.

9. The phase modulation active device of claim 8, wherein the binary setter is further configured to set the binary phase profile so that the phase modulation active device steers the incident light by θ, based on an equation, $$\sin\theta = \frac{\lambda}{\langle T_k \rangle},$$

wherein λ, denotes a wavelength of the incident light, $T_k$ denotes a kth period in which the arrangement pattern of the selected first phase value and the selected second phase is repeated, and $\langle T_k \rangle$ denotes the average value of the periods.

10. The phase modulation active device of claim 7, wherein the binary setter is further configured to:
   set a full phase profile having a phase value range from 0 to 2π to implement an optical performance of the phase modulation active device; and
   correct a phase value included in the full phase profile as the selected first phase value or the selected second phase value.

11. The phase modulation active device of claim 10, wherein the binary setter is further configured to:
   in response to the phase value being in first range, correct the phase value as the selected first phase value; and
   in response to the phase value being outside the first range, correct the phase value as the selected second phase value.

12. The phase modulation active device of claim 11, wherein a difference between the selected first phase value and the selected second phase value is π, and
   the first range is π/2 to 3π/2.

13. The phase modulation active device of claim 7, wherein the phase modulator comprises:
   an active layer having an optical property changing based on an electrical signal;
   a nano array layer adjacent to the active layer, and comprising nano structures; and
   an electrode layer configured to apply the electrical signal to the active layer.

14. The phase modulation active device of claim 13, wherein each of the nano structures has a shape having a dimension smaller than a wavelength of the incident light.

15. The phase modulation active device of claim 13, wherein the nano structures comprise a metallic material.

16. The phase modulation active device of claim 15, wherein the signal inputter is further configured to apply a voltage between each of the nano structures and the electrode layer.

17. The phase modulation active device of claim 13, wherein the nano structures comprise a dielectric material.

18. The phase modulation active device of claim 17, further comprising a conductive layer interposed between the nano array layer and the active layer,
wherein the signal inputter is further configured to apply a voltage between the conductive layer and the electrode layer.

19. A lidar apparatus comprising:
a light source configured to emit light;
a phase modulation active device configured to steer the emitted light to an object, and comprising:
   a phase modulator comprising channels configured to independently modulate a phase of incident light;
   a signal inputter configured to apply an input signal for phase modulation to each of the channels;
   a binary setter configured to:
      select a first phase value and a second phase value to be used for the channels; and
      set a binary phase profile by allocating the selected first phase value or the selected second phase value to each of the channels at irregular periods, in a sequence in which the channels are arranged; and
   a controller configured to control the signal inputter, based on the set binary phase profile; and
a sensor configured to receive the light steered to the object and reflected from the object.

20. The lidar apparatus of claim 19, wherein the binary setter is further configured to set binary phase profiles respectively implementing steering angles so that the phase modulation active device is configured to scan the object, and
the controller is further configured to time-sequentially control the signal inputter, based on the set binary phase profiles.

21. A phase modulation active device comprising:
a phase modulator comprising channels configured to independently modulate a phase of incident light;
a signal inputter configured to apply an input signal for phase modulation to each of the channels;
a binary setter configured to:
   select a first phase value and a second phase value to be used for the channels; and
   set a binary phase profile by allocating the selected first phase value or the selected second phase value to each of the channels, all of the channels being allocated by one of the selected first phase value and the selected second phase value; and
a controller configured to control the signal inputter, based on the set binary phase profile.

* * * * *